(12) United States Patent
Slawson et al.

(10) Patent No.: US 10,766,329 B2
(45) Date of Patent: Sep. 8, 2020

(54) VEHICLE WITH CHASSIS HEIGHT ADJUSTMENT HAVING FLOATING STRUT RODS

(71) Applicant: AGCO Corporation, Duluth, GA (US)

(72) Inventors: James Slawson, Spirit Lake, IA (US); Kyle Chirpich, Wells, MN (US)

(73) Assignee: AGCO Corporation, Duluth, GA (US)

(*) Notice: Subject to any disclaimer, the term of this patent is extended or adjusted under 35 U.S.C. 154(b) by 186 days.

(21) Appl. No.: 15/757,388

(22) PCT Filed: Sep. 1, 2016

(86) PCT No.: PCT/US2016/049987
§ 371 (c)(1),
(2) Date: Mar. 5, 2018

(87) PCT Pub. No.: WO2017/040847
PCT Pub. Date: Mar. 9, 2017

(65) Prior Publication Data
US 2018/0250997 A1 Sep. 6, 2018

Related U.S. Application Data

(60) Provisional application No. 62/214,456, filed on Sep. 4, 2015.

(51) Int. Cl.
*B60G 17/005* (2006.01)
*B60G 3/01* (2006.01)
*B60G 17/0165* (2006.01)

(52) U.S. Cl.
CPC ............ *B60G 17/005* (2013.01); *B60G 3/01* (2013.01); *B60G 17/0165* (2013.01);
(Continued)

(58) Field of Classification Search
CPC .... B60G 17/005; B60G 17/0165; B60G 3/01; B60G 2300/40; B60G 2204/43;
(Continued)

(56) References Cited

U.S. PATENT DOCUMENTS 3,554,524 A * 1/1971 Riehl ..................... B60G 15/00
267/64.19
3,558,148 A * 1/1971 Johnson ............... A61K 9/0019
280/124.106
(Continued)

OTHER PUBLICATIONS

European Patent Office, International Search Report for parent International Application No. PCT/US2016/049987, dated Oct. 21, 2016.

*Primary Examiner* — Frank B Vanaman

(57) ABSTRACT

A suspension module for supporting a vehicle chassis includes a module frame pivotably connected to an axle on the chassis and a wheelbox mounted to the wheel and slidingly coupled with the module frame by strut rods. The wheelbox and module frame pivot in unison with respect to the chassis, and the module frame is configured to move between a standard position and a high clearance position relative the wheelbox. The suspension module includes an adjustment actuator coupled with the module frame to shift the frame between the operating positions. The strut rods move from a first position in which bottom ends of the first and second strut rods are below the wheelbox when the module frame is in the standard position to a second position in which the bottom ends are in a higher position relative the first position when the module frame is in the high clearance position.

17 Claims, 6 Drawing Sheets

(52) U.S. Cl.
CPC .... *B60G 2200/44* (2013.01); *B60G 2202/152* (2013.01); *B60G 2202/413* (2013.01); *B60G 2202/42* (2013.01); *B60G 2204/4232* (2013.01); *B60G 2204/43* (2013.01); *B60G 2204/4605* (2013.01); *B60G 2300/083* (2013.01); *B60G 2300/40* (2013.01); *B60G 2500/30* (2013.01)

(58) Field of Classification Search
CPC ........ B60G 2202/42; B60G 2204/4605; B60G 2202/413; B60G 2200/446; B60G 2500/30; B60G 2300/083; B60G 2204/4232; B60G 2202/152; B60G 2200/44
See application file for complete search history.

(56) References Cited

U.S. PATENT DOCUMENTS

| | | | | |
|---|---|---|---|---|
| 3,788,433 A * | 1/1974 | Katsumori | ............ | B60G 15/00 188/314 |
| 4,186,815 A * | 2/1980 | Hart | ............ | B60G 17/033 180/24.08 |
| 4,334,600 A * | 6/1982 | Palitto | ............ | B60G 15/14 188/269 |
| 5,039,129 A * | 8/1991 | Balmer | ............ | B60G 3/04 180/209 |
| 5,570,761 A * | 11/1996 | Paton | ............ | F16F 7/082 188/271 |
| 6,017,047 A * | 1/2000 | Hoose | ............ | B60G 3/01 280/276 |
| 6,036,201 A * | 3/2000 | Pond | ............ | B60G 3/20 280/5.514 |
| 6,491,306 B2 * | 12/2002 | Schaffer | ............ | B60G 3/01 280/5.502 |
| 7,837,207 B2 * | 11/2010 | Kremmin | ............ | B60G 3/01 180/900 |
| 9,079,470 B2 | 7/2015 | Slawson | | |
| 9,296,273 B2 * | 3/2016 | Slawson | ............ | B60G 17/005 |
| 2010/0276238 A1 * | 11/2010 | Crasset | ............ | B62K 25/04 188/266.2 |
| 2012/0318588 A1 * | 12/2012 | Kroese | ............ | B60G 3/08 180/41 |

* cited by examiner

VEHICLE WITH CHASSIS HEIGHT ADJUSTMENT HAVING FLOATING STRUT RODS

CROSS REFERENCE TO RELATED APPLICATION

This application claims the benefit of U.S. Provisional Application No. 62/214,456 filed Sep. 4, 2015, which is hereby incorporated by reference in its entirety.

BACKGROUND OF THE INVENTION

Field of Invention

Embodiments of the present invention relate to mobile machines, such as self-propelled agricultural machines and similar vehicles. More particularly, embodiments of the present invention relate to mobile machines with adjustable-height chassis.

Description of Related Art

Some agricultural vehicles are configured to be operated in fields among row crops. Application machines such as self-propelled sprayers, for example, may have wheels configured to pass between crop rows and a spray boom that extends outwardly from the vehicle to spray the crop as the machine travels through the field. In order to avoid damaging the crops as the vehicle moves through the field, the vehicle should have sufficient ground clearance (the distance between the vehicle body and the surface over which it moves) to clear the crops.

While a standard height agricultural vehicle may be used to process short crops, such as early stage corn or the like, difficulties arise when processing taller crops, such as mature corn, that are taller than the ground clearance of a standard vehicle. For such crops, high clearance vehicles may be used. While high clearance vehicles provide sufficient clearance to pass over the top of taller crops, they suffer from various limitations. For example, high clearance vehicles, such as those that provide a crop clearance of seventy inches or more, may have an overall height that exceeds highway height restrictions, thereby making the transport of such vehicles to and from the field difficult. For example, public highways often restrict the height of a load to twelve feet or less which may be exceeded when a high clearance vehicle is placed on a transport trailer. Thus, measures may need to be taken to lower the vehicle to an acceptable transport height, such as deflating the tires or entirely removing the wheels.

In addition, while high clearance vehicles may be desirable for use on tall crops, they are not as effective in processing shorter crops without added complexity in the boom lifting mechanism to accommodate the range of motion required to place the boom at the proper height above the crop when spraying at the various crop heights. Some systems have been developed to increase the ground clearance of an existing vehicle. But these systems are complicated and require the removal of existing vehicle equipment and/or the addition of new equipment.

Height-adjustable suspension systems are known that have the ability to move the chassis from a standard operating height to a high clearance operating height. However, the difference in chassis height between the standard mode and the high clearance mode is limited by the size of the suspension components. As more ground clearance is needed, the suspension components that permit the change in operating height also need to be taller in order to gain the desired ground clearance. These taller components are not optimal as they can protrude into space reserved for other vehicle components or systems. It would be desirable to have a suspension system for vehicles that better utilizes available space for the height-adjusting components.

The above section provides background information related to the present disclosure which is not necessarily prior art.

OVERVIEW OF THE INVENTION

One aspect of the invention is a suspension module for supporting a vehicle chassis on a wheel of the vehicle. The suspension module includes a module frame pivotably connected to an axle on the vehicle chassis and a wheelbox mounted to the wheel and slidingly coupled with the module frame by first and second strut rods. The wheelbox and module frame are configured to pivot in unison with respect to the vehicle chassis, and the module frame is configured to move between a standard operating position and a high clearance operating position relative to the wheelbox. The suspension module also includes an adjustment actuator coupled with the frame and configured to shift the module frame between the standard operating position and the high clearance operating position. The first and second strut rods move from a first position in which bottom ends of the first and second strut rods are below the wheelbox when the module frame is in the standard operating position to a second position in which the bottom ends are in a higher position relative the first position when the module frame is in the high clearance operating position. The suspension module further includes first and second stabilizers for selectively coupling the first and second strut rods, respectively, with the wheelbox, wherein the stabilizers move and stabilize the strut rods into any of the operating positions relative to the module frame. The suspension module further includes a suspension assembly operably interposed between the module frame and the wheelbox for regulating motion transfer between the module frame and the wheelbox. The wheelbox is positioned below the axle, the suspension assembly is positioned above the axle, and the adjustment actuator is positioned within a pivot element of the axle such that the wheelbox, the suspension assembly, and the adjustment actuator all lie on a line that corresponds to an axis of rotation of the suspension module. In one embodiment, the wheelbox has a pair of wheelhub sleeves, wherein the each one of the pair of wheelhub sleeves slidingly engages one of the strut rods.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Figure 1:
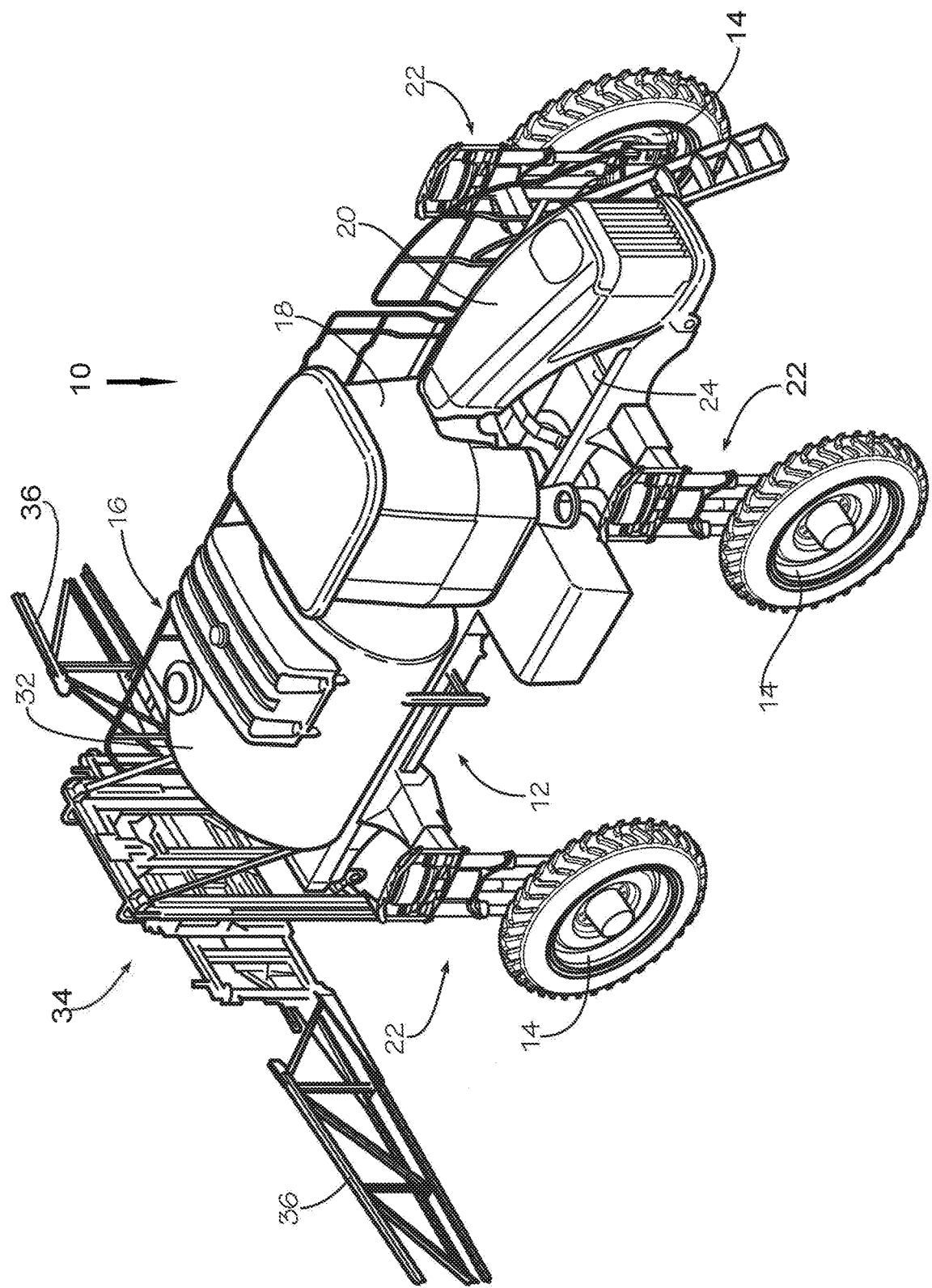
FIG. 1 is a perspective view of an agricultural applicator constructed in accordance with principles of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF EXEMPLARY EMBODIMENTS

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

The particular size and shape of the various components of the invention may vary substantially from one embodiment to another without departing from the spirit or scope of the invention. Therefore, while dimensions and proportions of various components are set forth herein, it will be understood that such information is provided by way of example and does not limit the scope of the invention as recited in the claims.

Figure 2:
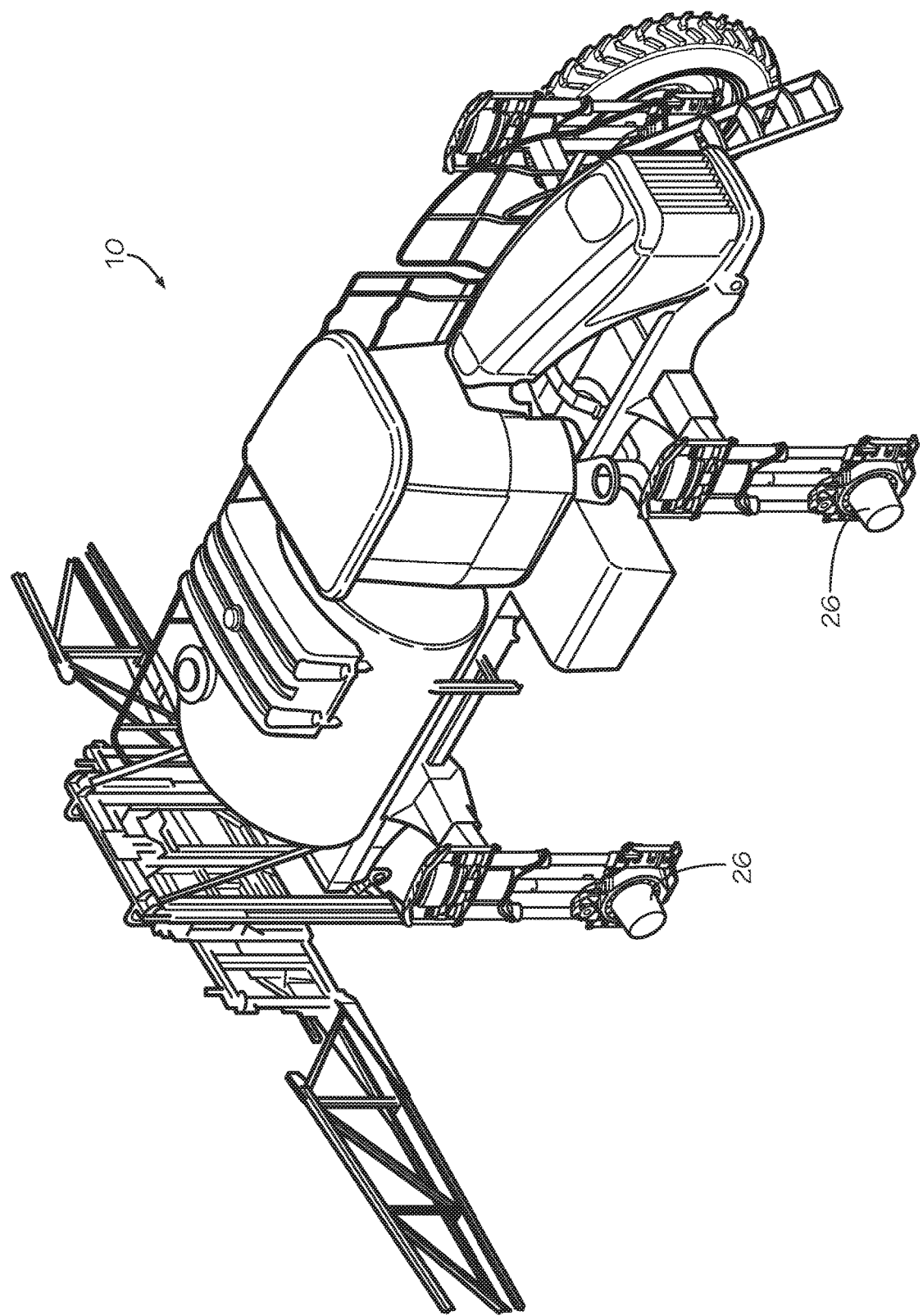
FIG. 2 is a perspective view of the agricultural applicator of FIG. 1 with two of the wheels omitted to more fully illustrate suspension modules interposed between the wheels and the chassis.

Turning now to the drawing figures, and initially FIGS. 1 and 2, an exemplary application vehicle 10 constructed in accordance with embodiments of the invention is illustrated. The application vehicle 10 broadly includes a chassis 12, a plurality of wheels 14 or other ground engaging elements supporting the chassis 12 above a ground surface, an application system 16, an operator cab 18, and an engine compartment 20. A plurality of suspension modules 22 interposed between the wheels 14 and the chassis 12 support the chassis 12 on the wheels 14 and provide suspension, height adjustment and/or steering functions, as discussed in greater detail below.

Certain components of the application vehicle 10 have been omitted from the figures for simplicity of illustration and to show certain features of the application vehicle 10 that would otherwise be concealed. The engine, for example, has been omitted to illustrate components of the applicator frame, including portions of the front axle 24. Certain hydraulic lines, such as hydraulic lines running to and from the suspension modules 22, are also omitted. The application vehicle 10 is illustrated and discussed herein as an exemplary machine with which the suspension modules 22 may be used. It will be appreciated by those skilled in the art that the suspension modules 22 may be used with other machines including other types of applicators or other vehicles or mobile machines that would benefit from the advantages of the various embodiments of the suspension modules disclosed herein, such as chassis height adjustment and independent suspension.

The application vehicle 10 includes a pair of front wheels 14 and a pair of rear wheels 14 of the appropriate size and shape to allow the application vehicle 10 to travel among row crops with minimal crop disturbance. A used herein, a "wheel" includes an inner, rigid wheel and an outer, flexible tire mounted on the wheel unless otherwise specified. Each wheel 14 may present, for example, an outer diameter of between sixty and eighty-five inches and a width of between ten and twenty-five inches. More specifically, wheels 14 designed for use with row crops may present an outer diameter of about seventy inches or about eighty inches and a width of about fifteen inches. Alternatively, the wheels 14 may present a width of up to twenty-five inches (or more) for pre-emergent applications, for use on soft terrain, or both to maximize flotation and minimize soil compaction. Each of the wheels 14 may weigh between 600 and 1,000 pounds and may specifically weigh about 700 pounds or about 800 pounds. In one exemplary embodiment, each of the wheels 14 is about seventy inches tall, about fifteen inches wide and weighs about 700 pounds. The particular size, shape and configuration of the wheels 14 is not important to the present invention and may vary substantially from one embodiment to another without departing from the spirit or scope of the invention. In some embodiments, the invention may be used with a vehicle with ground engaging elements other than wheels, such as tracks. Hereinafter, reference will be made to a "wheel" or "wheels" with the understanding that the illustrated wheels 14 may be replaced with other types of ground engaging elements without departing from the scope of the invention.

As seen in FIG. 2, one or more drive motors 26 may be associated with one or more of the wheels 14 for driving rotation of the wheel relative to the chassis 12 to thereby propel the application vehicle 10 in forward and reverse directions. In the illustrated embodiment, a separate hydraulic motor 26 is drivingly connected to each wheel 14 such that each of the wheels 14 may be driven independently to propel the application vehicle 10. Either two or all four of the wheels 14 may be steerable. In some embodiments, the steering functionality of some of the wheels 14 may be selectively enabled and disabled. By way of example, the front wheels 14 may always be steerable while supplemental steering provided by the rear wheels 14 may be selectively enabled and disabled. An operator may control the drive motors 26 and steering functions of the wheels 14, including enabling and disabling the steering ability of certain of the wheels 14, from one or more of the user interface elements of the cab 18.

Front and rear axles 24 are rigidly connected to the chassis 12. Desirably, the application vehicle 10 includes mechanisms for adjusting the track width of the wheels to accommodate, for example, different spacing needs for row crops. In one embodiment, the application vehicle 10 includes telescoping axles 24 that allow the wheels 14 to shift laterally relative to the chassis 12 as described in commonly assigned U.S. Pat. No. 9,079,470 and as would be understood by one skilled in the art. In the illustrated embodiment, the application vehicle 10 includes telescoping axles 24.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The delivery system 34 includes a pair of booms 36 supporting hoses, pumps and spray nozzles or similar components for dispersing or otherwise applying the contents of the tank to a crop. Alternatively, the application system 16 may be configured to apply dry material to a field and therefore may include a hopper and a mechanism for dispersing particulate material from the hopper, such as a pneumatic spreader or one or more spinners.

The operator cab 18 is supported on the chassis 12 and positioned forward of the application system 16. The cab presents a control environment that enables the operator to control the functions of the application vehicle 10, including operating the application system 16.

As mentioned above, the application vehicle 10 includes a suspension module 22 interposed between each of the wheels 14 and the chassis 12. Each suspension module 22 connects to a hub of one of the wheels 14 and to one of the axles 24 such that the wheel 14 and the suspension module 22 desirably shift laterally as a single unit relative to the chassis 12 when the axle 24 is shifted to adjust the applicator's track width. Additionally, one or more of the suspension modules 22 (or portions thereof) may be selectively pivotable relative to the chassis 12 to thereby steer the application vehicle 10. As will be more fully discussed below, the suspension modules 22 include height adjustment components for raising and lowering the chassis 12 of the vehicle between various operating positions. Each of the suspension modules 22 includes one or more actuators for adjusting a height of the chassis 12, for steering the associated wheel 14, or both. In some embodiments, the actuators are hydraulic actuators such as linear or rotary hydraulic actuators. The application vehicle 10 uses a hydraulic control system (not shown) controlling hydraulic actuators such as described in commonly assigned U.S. Pat. No. 9,079,470 and as would be understood by one skilled in the art for operating the suspension modules 22. It will be appreciated that various different types of technology may be used to actuate the suspension modules 22. Thus, while hydraulic actuators are used in one embodiment, it will be understood that other types of actuators may be used in place of, or in connection with, the hydraulic actuators without departing from the spirit or scope of the invention. By way of example, electro-mechanical actuators may be used in place of at least some of the hydraulic actuators.

Figure 3:
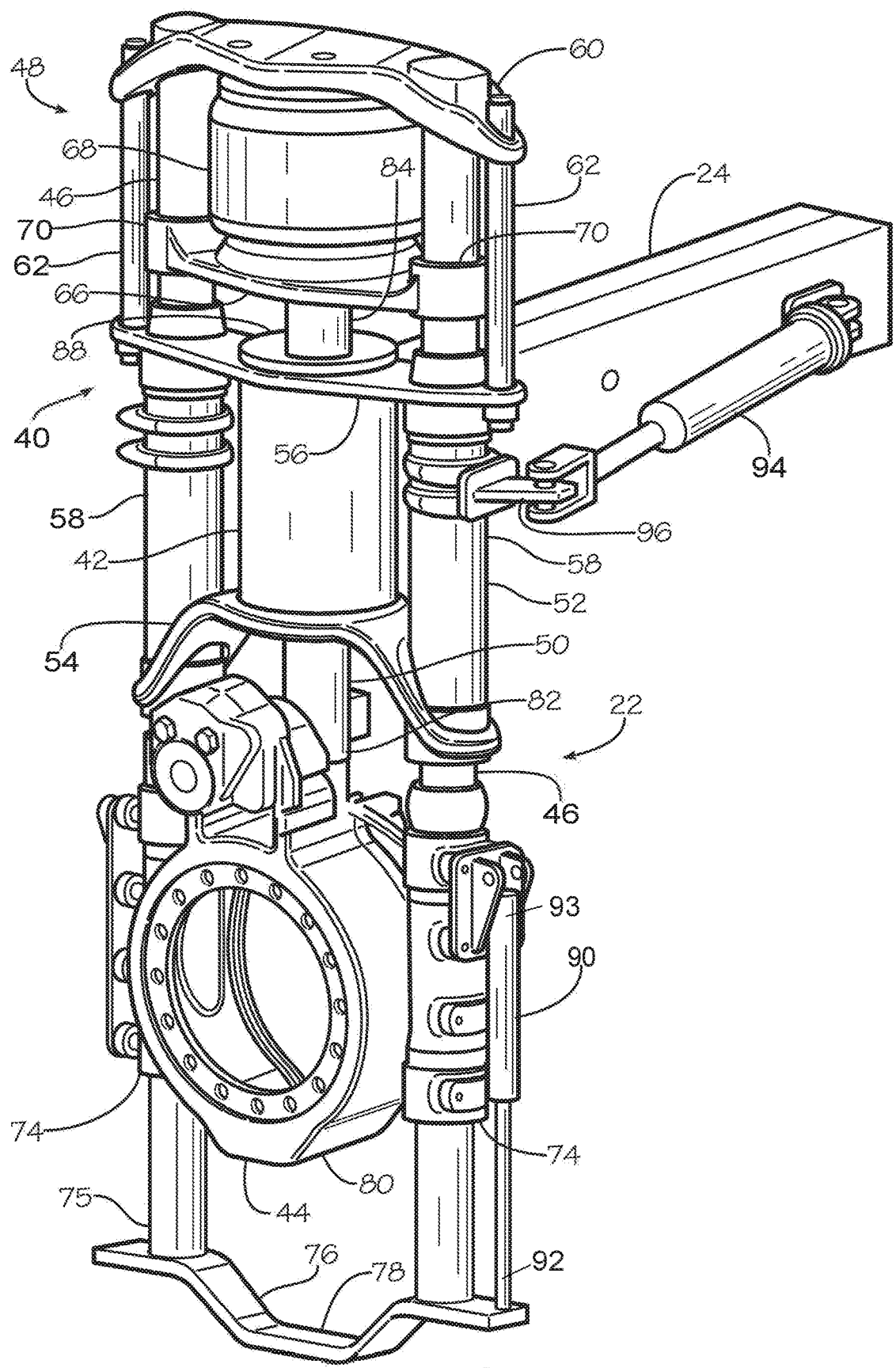
FIG. 3 illustrates the suspension module of FIG. 2 in a first operating position.
Figure 4:
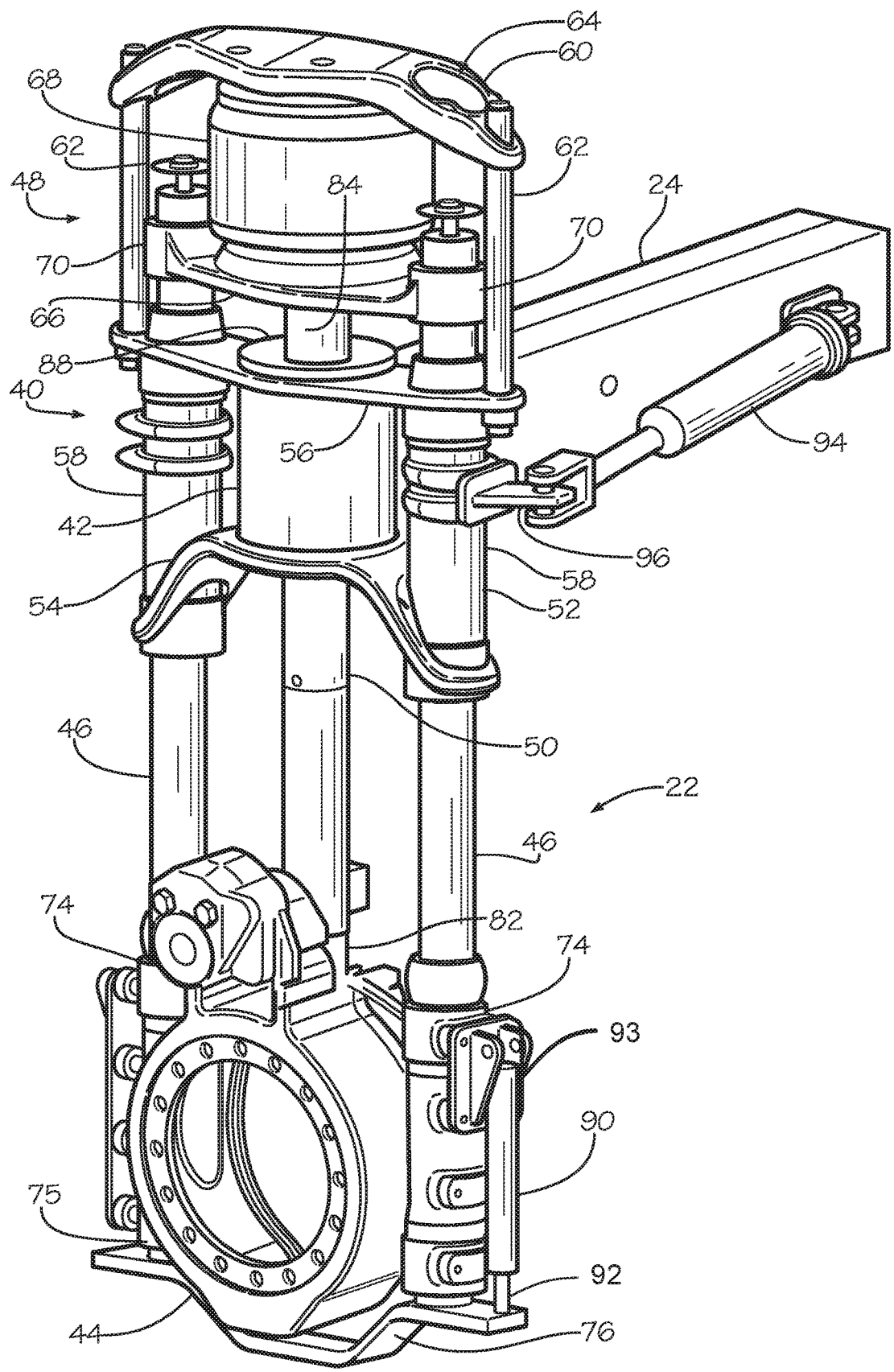
FIG. 4 illustrates the suspension module of FIG. 2 in a second operating position.

Turning now to FIGS. 3 and 4, one of the suspension modules 22 is illustrated in greater detail. The suspension module 22 broadly includes a module frame 40 pivotably connected with a pivot element 42 on the axle 24. The module frame 40 is connected to a wheelbox 44 with a pair of strut rods 46 that slidingly engage the wheelbox 44 and the module frame 40 so that the wheelbox 44 is configured to pivot in unison with the module frame 40 but is slidingly coupled with the module frame 40 such that the module frame 40 is able to move between a plurality of operating positions relative to the wheelbox 44. The suspension module 22 also includes a suspension assembly 48 operably interposed between the module frame 40 and the wheelbox 44 for regulating motion of the wheelbox 44 with respect to the module frame 40. The first and second strut rods 46 are parallel or substantially parallel and are separated by a space. The strut rods 46 slidingly engage the module frame 40 to allow the module frame 40 to move relative to the wheelbox 44 while also transferring pivot torque between the wheelbox 44 and the module frame 40. The length of each of the strut rods 46 may be between about twelve inches and about thirty-six inches and, more specifically, between about twenty inches and about thirty inches. The strut rods 46 may be positioned symmetrically about a center of the wheelbox 44 and a center of the module frame 40.

An adjustment actuator 50 is coupled with the module frame 40 and configured to shift the module frame 40 between any of the plurality of operating positions relative to the wheelbox 44 to thereby control the clearance height of the vehicle 10 relative the ground surface. The module frame 40 may be moveable between a first, standard clearance operating position (FIG. 3), a second, high clearance operating position (FIG. 4), and any position in-between. The difference in the position of the axle 24 relative the wheelbox 44 between the first standard clearance operating position and the second high clearance operating position may be within the range of about five inches to about fifty inches. More specifically, the difference may particularly be about ten inches, about twenty inches, about thirty inches, or about forty inches. As used herein, an "operating position" is a selectable position of the wheelbox 44 relative to the module frame 40. Fluctuations in the relative positions of the wheelbox 44 relative to the module frame 40 may result, for example, from operation of the suspension assembly 48, operation of a hydraulic component, or both. In operation, the suspension modules 22 may be used to raise and lower the chassis of the application vehicle 10. More specifically, an operator may remotely control operation of the suspension modules 22 to raise and lower the chassis 12 using, for example, user interface elements in the cab 18. Thus, the operator may raise and lower the chassis 12 while seated in the cab 18.

The module frame 40 includes a spindle 52 pivotably coupled with the pivot element 42 of the axle 24. In the illustrated embodiment, the spindle 52 has a lower attachment member 54 and an upper attachment member 56 separated by a space. Outer ends of the lower and upper attachment members 54, 56 are rigidly interconnected by a pair of spindle sleeves 58. In the illustrated embodiment, the spindle sleeves 58 are cylindrical in shape and each includes a through-hole or similar feature to slidingly engage one of the strut rods 46. Desirably, the lower and upper attachment members 54, 56 and sleeves 58 forming the spindle 52 are formed as an integral cast component, but may also be welded or otherwise joined together using sound engineering judgment.

A top suspension member 60 is separated from the upper attachment member 56 by a space, wherein a pair of suspension rods 62 rigidly interconnects the upper attachment member 56 and the top suspension member 60. The top suspension member 60 includes a pair of through holes 64 (seen in FIG. 4) for slidingly receiving the strut rods 46.

The suspension assembly 48 includes an idler member 66 with an airbag, broadly a suspension component 68, coupled to an upper side of the idler member 66, and with the adjustment actuator 50 coupled to a lower side thereof. In the illustrated embodiment, the suspension component 68 is an airbag or pneumatic spring, but one skilled in the art will understand that other suspension components may be used, including, for example, coil-type compression springs and shock-absorbing cylinder and piston assemblies without departing from the scope of the invention for regulating motion transfer between the wheelbox 44 and the module frame 40. The idler member 66 is an elongated, rigid member that further defines a pair of cylindrical barrel portions 70 at the ends thereof for slidingly receiving the strut rods 46. Thus, the suspension component 68 is positioned within the module frame 40 such that the suspension component 68, the module frame 40 and the wheelbox 44 all pivot in unison to steer the vehicle 10. Desirably, the suspension component 68 uses trapped or compressed air or other fluid to regulate motion transfer between the pivot element 42 and the wheelbox 44. The suspension component 68 may contain air, water, nitrogen, antifreeze or other fluid and may be single, double, or triple convolute.

The suspension assembly 48 of the suspension module 22 may be the primary component of the application vehicle 10 configured to regulate motion transfer between the wheels 14 (or other ground engaging element) and the chassis 12. The axles 24, for example, may be rigidly connected to portions of the chassis 12. Furthermore, the suspension assembly 48 operates to regulate motion transfer between the wheels 14 and the chassis 12 regardless of the operating position of the suspension modules 22. Thus, the suspension assembly 48 performs essentially the same function regardless of whether the chassis 12 is in a lowered position (e.g., FIG. 3), a raised position (e.g., FIG. 4) or somewhere in between.

The wheelbox 44 has a pair of wheelhub sleeves 74 on outer sides thereof. In the illustrated embodiment, the wheelhub sleeves 74 are cylindrical in shape and each includes a through-hole or similar feature to slidingly engage one of the strut rods 46. Desirably, the wheelhub sleeves 74 and wheelbox 44 are formed as an integral cast component, but may also be welded or otherwise joined together using sound engineering judgment.

In the illustrated embodiment, the wheelbox 44 is positioned below the axle 24, the suspension assembly 48 is positioned above the axle 24, and the adjustment actuator 50 is positioned within the pivot element 42 of the axle 24 such that the wheelbox 44, the suspension assembly 48, and the adjustment actuator 50 all lie on a line that corresponds to or is parallel with the axis of rotation of the suspension module 22. The spindle sleeves 58 are positioned proximate and on opposite sides of the pivot element 42 of the axle 24, and the suspension rods 62 are positioned on opposite sides of the suspension component 68 and outboard of the strut rods 46.

On each side of the module frame 40, the wheelhub sleeve 74, the spindle sleeve 58, the barrel portion 70 of the idler member 66, and the through hole 64 in the top suspension member 60 all align for slidingly receiving the respective strut rod 46. Bottom ends 75 of the strut rods 46 extend below the wheelbox 44 in at least the standard clearance operational position, allowing the strut rods 46 to extend into space not previously used. Desirably, the bottom ends 75 of the strut rods 46 are connected with a bottom connector casting 76 that joins the strut rods 46. In the illustrated embodiment, the bottom connector casting 76 is an elongate member with a valley 78 formed therein that meshes with a bottom portion 80 of the wheelbox 44 when the suspension module 22 is in the high clearance position.

Figure 5:
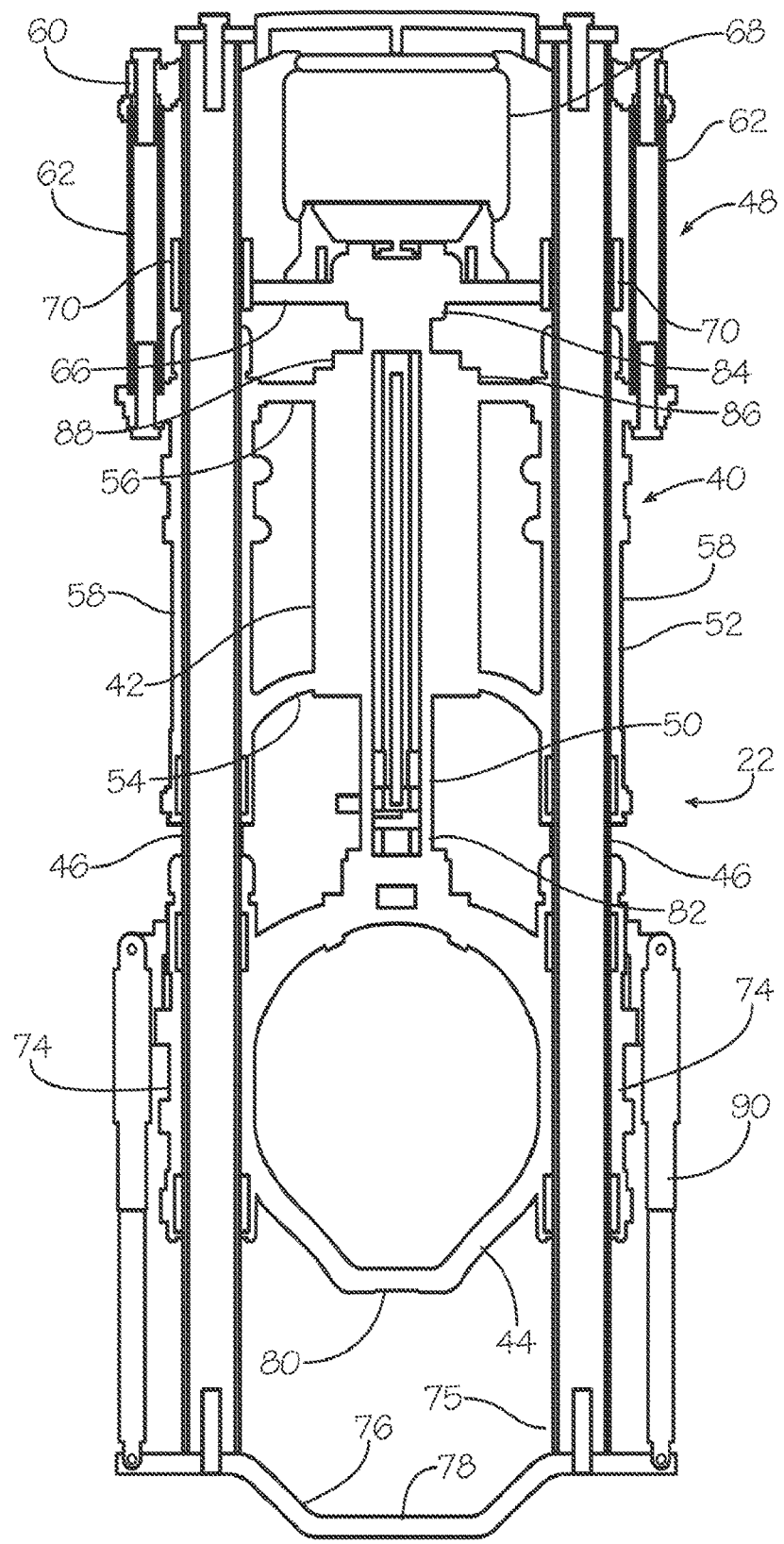
FIG. 5 is a cross-sectional view of the suspension module in the operating position of FIG. 3.
Figure 6:
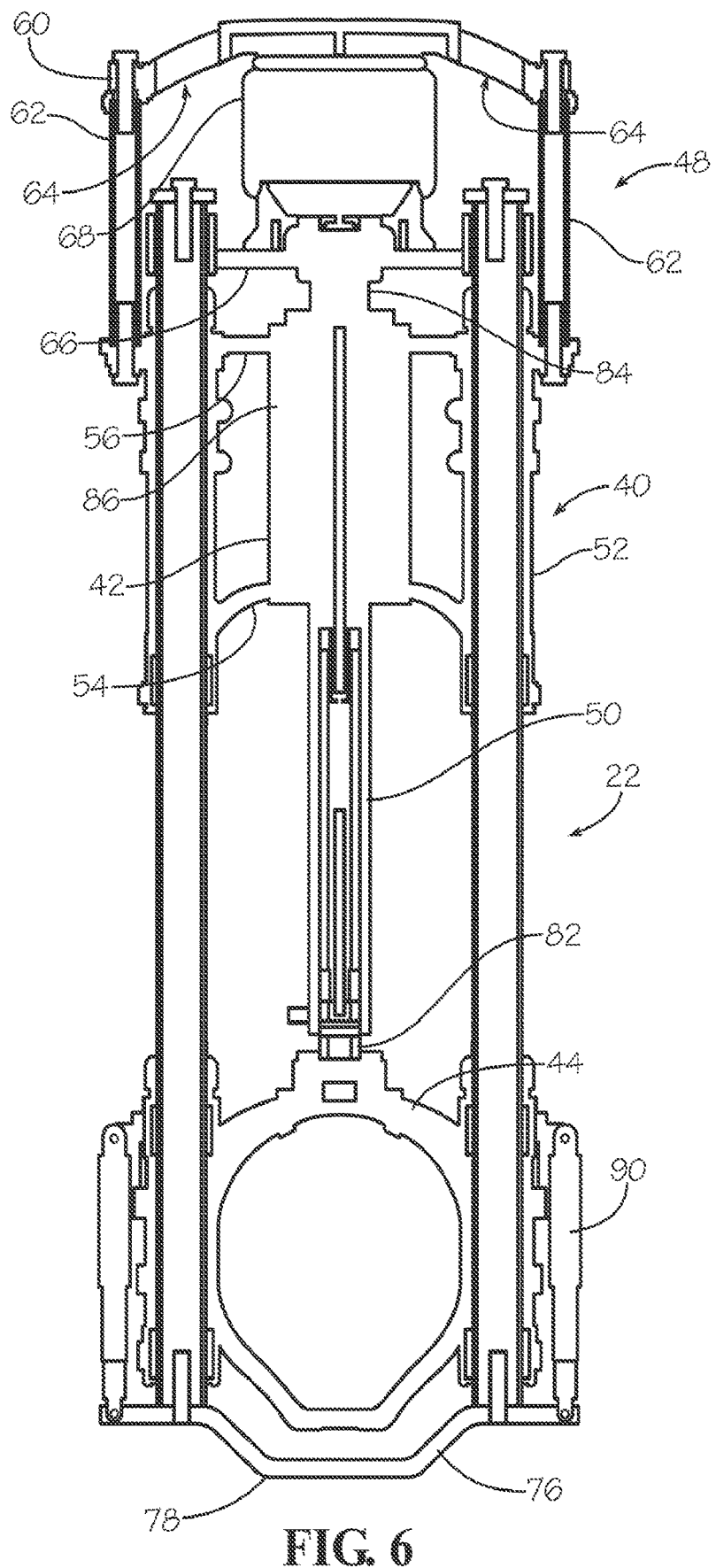
FIG. 6 is a cross-sectional view of the suspension module in the operating position of FIG. 4.

As best seen in FIGS. 5 and 6, in the illustrated embodiment the adjustment actuator 50 includes a conventional hydraulic lift cylinder connected to the wheelbox 44 at its lower end 82 and connected to the idler member 66 at its upper end 84. A bushing 86 extends between the lower and upper attachment members 54, 56 of the spindle 52 within the pivot element 42 to facilitate rotation of the module frame 40 relative to the pivot element 42 and is secured to the spindle 52 with a spindle cap 88. The lift cylinder 50 drives the module frame 40 between the plurality of operating positions relative to the wheelbox 44. It will be appreciated that this configuration reduces the number of exposed components as well as the overall size of the suspension module 22.

The suspension module 22 includes a stabilizer 90 for selectively coupling each of the strut rods 46 with the wheelbox 44. As the adjustment actuator 50 moves the module frame 40 between the standard operating position and the high clearance operating position relative to the wheelbox 44, the strut rods 46 move from a first position in which bottom ends 75 of the strut rods 46 are below the wheelbox 44 to a second position in which the bottom ends 75 are in a higher position relative the first position. The stabilizers move and stabilize the strut rods 46 into any of the plurality of operating positions relative to the module frame 40. In the illustrated embodiment, the stabilizer 90 is a gas spring. A piston rod end 92 of the stabilizer 90 engages the bottom connector casting 76 at the bottom of the stabilizer rod 46 and the cylinder body end 93 of the stabilizer 90 is attached to the wheelhub sleeve 74 of the wheelbox 44. Although, due to the nature of the suspension module 22, a device is needed in order to stabilize the strut rods 46 as the strut rods 46 are "floating" in the suspension module 22. As the suspension module 22 is engaged into high clearance position, the gas springs 90 are compressed. When the suspension module 22 is lowered to the standard clearance position, the potential energy in the gas springs 90 is released until the springs fully extend, at which point the strut rods 46 are in desired position for standard clearance operation. One skilled in the art will understand that other technologies could be used for the stabilizers in place of the gas springs, including mechanical springs, hydraulic cylinders, limiter straps/rods, or electronic and/or pneumatic actuators, without departing from the scope of the invention.

A pivot actuator 94 is pivotably coupled with the axle 24 and pivotably coupled with a pivot flange 96 on one of the spindle sleeves 58 of the module frame 40 to pivot the suspension module 22 relative to the axle 24 and thereby steer the wheel 14 attached to the wheelbox 44. In the illustrated embodiment, the pivot actuator 94 is a hydraulic cylinder. Alternately, the pivot actuator 94 may include a rotatory hydraulic actuator connected to the axle 24 and to the spindle 52. The pivot actuator 94 selectively drives pivoting movement of the suspension module 22 relative to the chassis 12 and may be controlled by a vehicle operator or an automated guidance system to steer the application vehicle 10. The suspension module 22 is configured to pivot relative to the axle 24 to thereby pivot a wheel 14 coupled with the wheelbox 44 and steer the application vehicle 10. The suspension module 22 may pivot between a first extreme position and a second extreme position about an axis of rotation passing through, and defined by, the pivot element 44. The extreme pivot positions may correspond to an angular separation of between, for example, about 90° and about 300°. The suspension module 22 pivots as a single unit such that, regardless of the position of the wheelbox 44 relative to the module frame 40, the wheelbox 44, the module frame 40, and the suspension assembly 48 pivot in unison.

In one exemplary scenario, the operator fills the holding tank 32 at a central location, such as a local cooperative facility, and drives the application vehicle 10 to a field in a lowered operating position. Once at the field, the operator controls the suspension modules 22 to raise the chassis 12 to a desired height to apply the product. The operator raises the chassis 12 while seated in the cab 18. When the application is complete or when the application vehicle 10 needs to return to the cooperative for additional product, the operator lowers the chassis 12 and drives the application vehicle 10 to the cooperative or to another field. Thus, adjusting the height of the chassis 12 allows for safer travel to and from the field by lowering the applicator's center of gravity and overall height.

In another exemplary scenario, the application vehicle 10 and a tender vehicle are taken to an area of application such as a field or group of fields. The application vehicle 10 is placed in a lowered chassis position and prepared by filling it with liquid chemical or other product to be applied to a crop. The tender vehicle may be configured to interface with the application vehicle 10 only when the application vehicle 10 is in a lowered chassis position. When the application vehicle 10 is prepared, the operator may drive the application vehicle 10 to a starting position, raise the chassis 12 to a desired height using one or more interface elements within the cab 18, and begin the application process. The operator refills the application vehicle 10 by returning to the tender vehicle, lowering the applicator chassis 12 to interface with the tender vehicle, and then raising the chassis 12 after the application vehicle 10 has been refilled and resumes the application operation. When application for a first crop is complete, the application vehicle 10 may be used to apply a chemical to a second crop of a different height than the first crop. The operator may adjust the chassis height of the application vehicle 10 for optimal application on the second crop, wherein the optimal height for application on the second crop may be different than the optimal height for application on the first crop.

Although the invention has been described with reference to the exemplary embodiments illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A suspension module for supporting a vehicle chassis on a wheel of the vehicle, the suspension module comprising:
   a module frame pivotably connected to an axle on the vehicle chassis;
   a wheelbox mounted to the wheel and slidingly mounted to the module frame by first and second strut rods, the wheelbox and module frame being configured to pivot in unison with respect to the vehicle chassis, wherein the module frame is configured to move between a first operating position and a second operating position relative to the wheelbox; and
   an adjustment actuator coupled with the module frame and configured to shift the module frame between the first operating position and the second operating position, wherein the first and second strut rods move from a first position in which bottom ends of the first and second strut rods are below the wheelbox when the module frame is in the first operating position to a second position in which the bottom ends are in a higher position relative to the first position when the module frame is in the second operating position.

2. The suspension module of claim 1, further comprising first and second stabilizers coupling the first and second strut rods, respectively, with the wheelbox, wherein the stabilizers are configured to stabilize the strut rods when the module frame is in the first operating position or the second operating position and move the strut rods such that the module frame travels between the first operating position and the second operating position.

3. The suspension module of claim 2, wherein each of the first and second stabilizers comprises a gas spring, wherein a first end of each of the first and second stabilizers engages the bottom end of a respective strut rod, and wherein a second end of the stabilizer is attached to the wheelbox.

4. The suspension module of claim 3, wherein a piston rod end of each of the first and second stabilizers engages the bottom end of a respective strut rod, and wherein a cylinder body end of the stabilizer is attached to the wheelbox.

5. The suspension module of claim 1, further comprising a suspension assembly operably interposed between the module frame and the wheelbox for regulating motion of the module frame with respect to the wheelbox.

6. The suspension module of claim 5, wherein the wheelbox is positioned below the axle, the suspension assembly is positioned above the axle, and the adjustment actuator is positioned within a pivot element of the axle such that the wheelbox, the suspension assembly, and the adjustment actuator all lie on a line that corresponds to an axis of rotation of the suspension module.

7. The suspension module of claim 6, wherein the wheelbox comprises a pair of wheelhub sleeves, wherein each one of the pair of wheelhub sleeves slidingly engages one of the strut rods.

8. The suspension module of claim 7, wherein the module frame comprises a spindle pivotably coupled with a pivot element of the axle, wherein the spindle has a lower attachment member and an upper attachment member with outer ends of the lower and upper attachment members being rigidly interconnected by a pair of spindle sleeves, and wherein each one of the spindle sleeves slidingly engages one of the strut rods.

9. The suspension module of claim 8, wherein the module frame further comprises a top suspension member separated from the upper attachment member, wherein a pair of suspension rods rigidly interconnect the upper attachment member to the top suspension member, and wherein the top suspension member defines a pair of through holes for slidingly receiving the strut rods.

10. The suspension module of claim 9, wherein the suspension assembly comprises an idler member and a suspension component, the suspension component coupled to an upper side of the idler member, wherein the adjustment actuator is coupled to a lower side of the idler member.

11. The suspension module of claim 10, wherein the idler member comprises an elongated, rigid member that further defines a pair of cylindrical barrel portions at ends thereof for slidingly receiving the strut rods.

12. The suspension module of claim 11, wherein one of the wheelhub sleeves, one of the spindle sleeves, one of the barrel portions of the idler member, and one of the through holes in the top suspension member all align for slidingly receiving one of the strut rods.

13. The suspension module of claim 10, wherein the adjustment actuator comprises a hydraulic lift cylinder, wherein a lower end of the hydraulic lift cylinder is connected to the wheelbox, and wherein an upper end of the hydraulic lift cylinder is connected to the idler member.

14. The suspension module of claim 1, wherein the bottom ends of the strut rods are connected with a bottom connector casting that joins the strut rods.

15. The suspension module of claim 1, wherein the wheelbox lies on a line that corresponds to an axis of rotation of the module frame.

16. The suspension module of claim 1, wherein the wheelbox is positioned below the axle and the adjustment actuator is positioned within a pivot element of the axle such that the wheelbox and the adjustment actuator lie on a line that corresponds to an axis of rotation of the suspension module.

17. A vehicle, comprising:
 a chassis comprising at least one axle;
 a plurality of wheels supporting the chassis;
 a plurality of suspension modules, each suspension module coupling one of the plurality of wheels to the at least one axle, and each suspension module comprising:
  a module frame pivotably connected to the at least one axle;
  a wheelbox mounted to the wheel and slidingly mounted to the module frame by first and second strut rods, the wheelbox and module frame being configured to pivot in unison with respect to the chassis, wherein the module frame is configured to move between a first operating position and a second operating position relative to the wheelbox; and
  an adjustment actuator coupled with the module frame and configured to shift the module frame between the first operating position and the second operating position, wherein the first and second strut rods move from a first position in which bottom ends of the first and second strut rods are below the wheelbox when the module frame is in the first operating position to a second position in which the bottom ends are in a higher position relative to the first position when the module frame is in the second operating position.

* * * * *